United States Patent
Gracieux

(10) Patent No.: US 8,509,803 B2
(45) Date of Patent: Aug. 13, 2013

(54) SYSTEM AND METHOD FOR PROVIDING TERRITORY-BASED ACTIONABLE EVENTS

(75) Inventor: Marc Gracieux, Cary, NC (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1112 days.

(21) Appl. No.: 12/195,846

(22) Filed: Aug. 21, 2008

(65) Prior Publication Data
US 2010/0048222 A1   Feb. 25, 2010

(51) Int. Cl.
*H04W 24/00* (2009.01)
(52) U.S. Cl.
USPC .................. 455/456.1; 455/456.2; 455/456.3; 455/457
(58) Field of Classification Search
USPC .......... 455/550.1, 404.1–404.2, 456.1–456.3, 455/418, 414.1; 705/14.58; 379/201.01, 379/207.12
See application file for complete search history.

(56) References Cited

U.S. PATENT DOCUMENTS

| | | | |
|---|---|---|---|
| 7,818,016 B2 * | 10/2010 | Ahn | 455/456.1 |
| 2004/0192337 A1 * | 9/2004 | Hines et al. | 455/456.1 |
| 2004/0198386 A1 * | 10/2004 | Dupray | 455/456.1 |
| 2004/0248586 A1 * | 12/2004 | Patel et al. | 455/456.1 |
| 2005/0085257 A1 * | 4/2005 | Laird et al. | 455/550.1 |
| 2007/0087764 A1 * | 4/2007 | Buckley et al. | 455/466 |
| 2008/0188241 A1 * | 8/2008 | Mo et al. | 455/456.3 |
| 2009/0029672 A1 * | 1/2009 | Manz | 455/404.2 |
| 2009/0170467 A1 * | 7/2009 | Nowlan et al. | 455/404.1 |
| 2009/0170531 A1 * | 7/2009 | Hampel et al. | 455/456.3 |
| 2009/0325538 A1 * | 12/2009 | Sennett et al. | 455/404.2 |

* cited by examiner

*Primary Examiner* — Kathy Wang-Hurst

(57) ABSTRACT

An approach is provided for territory-based actionable events. Positional information corresponding to a location of a device is received over a communication network. The location is correlated to one or more predefined territories. An alert is selectively generated based on the correlation, wherein an event is performed in response to generation of the alert.

22 Claims, 9 Drawing Sheets

SYSTEM AND METHOD FOR PROVIDING TERRITORY-BASED ACTIONABLE EVENTS

BACKGROUND INFORMATION

Consumer adoption of mobile devices, such as cellular telephones, laptop computers, pagers, personal digital assistants, and the like, is increasing. These devices can be used for a diversity of purposes ranging from basic communications, to conducting business transactions, to managing entertainment media, and a host of other tasks. Additional enhancements, such as location-awareness features, e.g., global positioning system (GPS) tracking, also enable mobile device users to monitor their position and present their location via a local display. As such, mobile devices tend to store an abundant amount of personal or otherwise sensitive information. Unfortunately, the portability and size of these devices often leads to device misplacement, loss, and even theft, all of which translate into an inability to safeguard this personal information. In most instances, mobile device owners are unaware of these events until a problem arises from compromise of such information.

Therefore, there is a need for an approach that provides efficient techniques to track, locate, and find mobile devices, as well as safeguard the stored information.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing territory-based actionable events are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to global positioning system (GPS) technology, it is contemplated that various exemplary embodiments are also applicable to other equivalent navigational and location determination technologies. Further, while various exemplary embodiments are described with respect to mobile devices, it is contemplated that various exemplary embodiments are equally applicable to providing territory-based actionable events based on spatial positioning (or location) of stationary devices, as well as animate and inanimate objects (or things).

Figure 1:
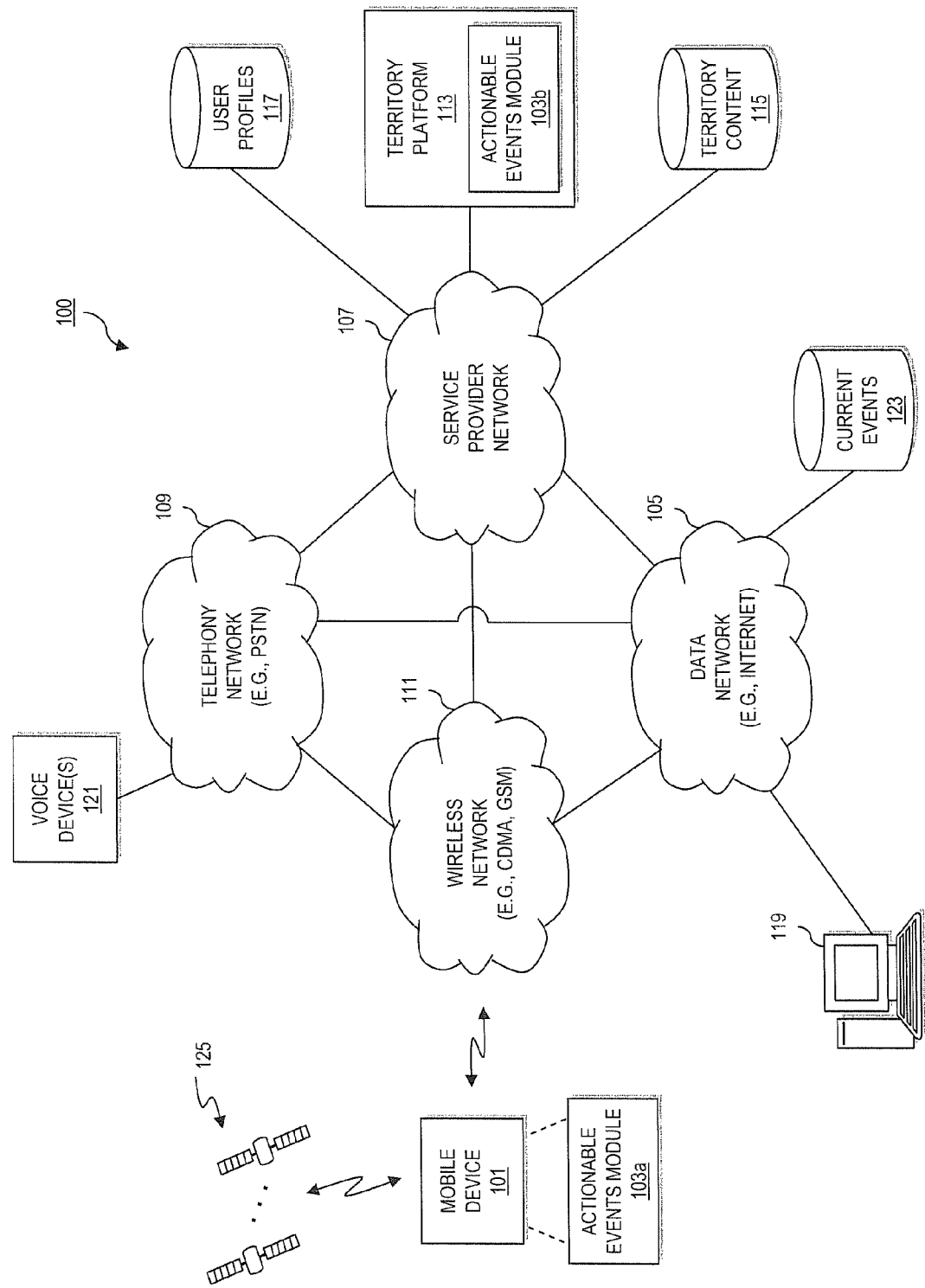
FIG. 1 is a diagram of system capable of providing territory-based actionable events, according to an exemplary embodiment.

FIG. 1 is a diagram of a system capable of providing territory-based actionable events, according to an exemplary embodiment. For the purposes of illustration, system 100 is described with respect to a mechanism for selectively initiating one or more actionable events based on the location of one or more mobile devices (e.g. mobile device 101) in relation to one or more predefined territories. In exemplary embodiments, the mechanism may reside locally within respective mobile devices, such as actionable events module 103a of mobile device 101, or alternatively (or additionally), may reside remotely over one or more networks (e.g., data network 105, service provider network 107, telephony network 109, and wireless network 111), such as actionable events module 103b of territory platform 113. Territory platform 113 can be maintained and operated by a service provider. In this manner, territory-based actionable events (e.g., initiating communication sessions, providing the location of mobile devices, or remotely configuring mobile devices) may be network-coordinated and/or coordinated by respective mobile devices 101. While specific reference will be made thereto, it is contemplated that system 100 may embody many forms and include multiple and/or alternative components and facilities.

It is observed that mobile device users who enjoy an increased level of mobility have to be mindful of their location, as well as keep a vigilant eye on their mobile device to ensure the device and/or the information stored thereon is not misplaced, lost, or stolen. Traditionally, there has been no established process to recognize a device is in a particular territory and alert a responsible party for taking an immediate and/or specific action. Even when a device is reported lost, conventional approaches have little, if any prospect of recovering the device. Most mobile device owners have relied on password and encryption techniques to protect their information; however, encrypted data once in the hands of another, may be eventually decrypted. Moreover, the mobile device may be in a location where it should not be, such as a competitor location where an otherwise authorized user may be voluntarily revealing sensitive data to a competitor.

Therefore, the approach employed by the territory platform 113, according to certain embodiments, stems from the recognition that providing a territory-based actionable event functionality, whereby one or more actionable events may be initiated or performed based on the location of a mobile device (e.g., device 101) in relation to one or more predefined territories, provides an effective technique to monitor, locate, and find mobile devices, as well as safeguard the information stored thereto.

In certain embodiments, territory-based actionable events may be provided utilizing one or more of actionable events modules 103a and 103b. Namely, the spatial positioning of one or more mobile stations 101 may be monitored in relation to one or more predefined territories, such that if mobile station 101 enters (or leaves) a particular territory, an alert may be generated, and one or more actionable events may be initiated based on the alert. Actionable events modules 103a and 103b may further determine which one or more actionable events to initiate based on user profile information associated with respective mobile devices 101. Such automated initiation of actionable events relieves users of the burden of worrying whether the sensitive information stored to their mobile devices is at risk, as well as facilitates the retrieval of misplaced, lost, or stolen mobile devices. This approach, which is more fully described below with respect to FIGS. 3-7, also enables users (or subscribers) to create, share, and manage custom territory definitions. Territories may also be dynamically created based on, for example, current events information, e.g., news, traffic, trouble tickets, weather, etc.

As seen in FIG. 1, actionable events modules 103a and 103b may utilize information or content stored to territory content repository 115 or user profiles repository 117, which can be accessed, downloaded, modified, and uploaded to repositories 115 and 117 via one or more client programs or otherwise networked applications. That is, users may access territory platform 113 via a portal application, such as voice portal or a web portal. In exemplary embodiments, an application for providing the portal is deployed via territory platform 113; however, it is contemplated that another facility or component of system 100, such as a frontend, middleware, or backend server accessible over one or more of networks 105-111, can deploy the application and, consequently, interface with territory platform 113. The portal includes or provides access to one or more catalogs of territory content, such as one or more catalogs stored to territory content repository 115, as well as user profile information stored to user profiles repository 117. In this manner, the portal enables users to input corresponding authentication information and, subsequently, define and manage one or more user-defined territories. The portal also enables users to construct user profiles that, in exemplary embodiments, include user profile information (or policies) for providing territory-based actionable events. Further, the portal may be utilized by authorized individuals to ascertain the location of a mobile device, such as mobile device 101. In this manner, territory platform 113 may also be accessible to suitable computing devices 119 or suitable voice stations 121.

Accordingly, service provider network 107 enables client devices 101, 119, and 121 to access the managed territory-based services (or functionality) through territory platform 113 via networks 105, 109, and 111. Networks 105, 109, and 111 may be any suitable wireline and/or wireless network. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 105 may be any local area network (LAN), metropolitan area network (MAN), wide area network (WAN), the Internet, or any other suitable packet-switched network, such as a commercially owned, proprietary packet-switched network having voice over internet protocol (VOIP) capabilities, e.g., a proprietary cable or fiber-optic network.

Although depicted as separate entities, networks 105-111 may be completely or partially contained within one another, or may embody one or more of the aforementioned infrastructures. For instance, service provider network 107 may embody circuit-switched and/or packet-switched networks that include facilities to provide for transport of circuit-switched and/or packet-based communications. It is further contemplated that networks 105-111 may include components and facilities to provide for signaling and/or bearer communications between the various components or facilities of system 100. In this manner, networks 105-111 may embody or include portions of a signaling system 7 (SS7) network, or other suitable infrastructure to support control and signaling functions.

Accordingly, territory-based actionable events and/or user access of territory platform 113 may be initiated or performed over one or more of networks 105-111. As such, client devices 101, 119, and 121 may include any customer premise equipment (CPE) capable of sending and/or receiving information over one or more of networks 105-111. For instance, voice station 121 may be any suitable plain old telephone service (POTS) device, facsimile machine, etc., while mobile device 101 may be any cellular phone, radiophone, satellite phone, smart phone, wireless phone, or any other suitable mobile device, such as a personal digital assistant (PDA), pocket personal computer, tablet, customized hardware, etc. Further, computing device 119 may be any suitable computing device, such as a VoIP phone, skinny client control protocol (SCCP) phone, session initiation protocol (SIP) phone, IP phone, personal computer, softphone, workstation, terminal, server, etc.

Client devices 101, 119, and 121 and, in particular mobile device 101, can include one or more client programs that operate thereon for providing access to the territory-based actionable events service of system 100. However, it is contemplated that these client programs may be executed via platform 113 and, thereby, accessible to users via mobile device 101. According to one embodiment, these client programs may relate to one or more GUIs configured to interface with the various services (or functions) of system 100, such as creating, customizing, and managing user profiles or territory content. Additionally, the GUIs may be configured to facilitate the acquisitioning, exchanging, managing, sharing, storing, and updating of territory content or user profiles between and among the subscribers to the service of system 100. The GUI applications may interface with the aforementioned web portal or otherwise networked application.

As previously mentioned, territory content repository 115 stores territory content, such as one or more territories (or geographic regions) that are predefined by users, third-parties, service providers, or dynamically created by territory platform 113 based on current events information. In this way, repository 115 may be maintained by the service provider of the territory-based actionable events service, or other suitable third-party. Current events repository 123 stores current event information such as natural disasters, emergency situations, trouble ticket occurrences (e.g., network outages), crimes, sport games, or other newsworthy happenings or events. This information may be generated by the service provider of the territory-based actionable events service or any other suitable third-party, such as a news broadcasting agency. It is noted that the current events information may be associated with a particular geographic location or area of applicability, as well as particular days and/or times of applicability. This information, as will be explained in more detail below, can be utilized for dynamically creating and/or scheduling territory definitions, which can also be stored to territory content repository 115.

User profiles repository 117 may include information corresponding to the users (or subscribers) of the territory-based actionable events service (or functionality) of system 100, such as user profile information including information or policies for establishing one or more territories, initiating, performing, or scheduling actionable events, etc. By way of example, user profile information includes subscription information (e.g., account numbers, usernames, passwords, security questions, monikers, etc.), subscriber demographics (e.g., age, gender, ethnicity, location of residence, zip code, school district, community, socioeconomic status, religion, marital status, ownerships, languages, mobility, life cycles, etc.), group/organizational affiliations (e.g., political), memberships, interests, system configurations, policies, associated users/devices, etc. In other instances, user profile information also includes historical and/or real-time spatial positioning information relating to the spatial position or location of mobile devices 101 associated with the user profile.

Accordingly, it is contemplated that the physical implementation of repositories 115, 117, and 123 may take on many forms, including, for example, portions of existing repositories of a service provider, new repositories of a service provider, third-party repositories, and/or shared-repositories. As such, repositories 115, 117, and 123 may be configured for communication over system 100, through any suitable messaging protocol, such as lightweight directory access protocol (LDAP), extensible markup language (XML), open database connectivity (ODBC), structured query language (SQL), and the like, as well as combinations thereof. In those instances when repositories 115, 117, and 123 are provided in distributed fashions, information and content available via repositories 115, 117, and 123 may be located utilizing any suitable querying technique, such as electronic number matching, distributed universal number discovery (DUNDi), uniform resource identifiers (URI), etc.

Although the territory-based actionable events function is described with respect to mobile device 101, it is recognized that the territory-based actionable events function can be applied to any device capable of transmitting its location to territory platform 113 or performing the processes described herein. Such devices may, in certain embodiments, include computing device 119 and voice station 121, as well as mobile device 101. In other embodiments, a location module (such as location module 813 of FIG. 8) may be attached (or otherwise associated with) an animate or inanimate object (or thing), such that one or more territory-based actionable events may be initiated or performed based on the spatial positioning (or location) of the animate or inanimate object (or thing). According to other exemplary embodiments, a mobile device 101 may be attached to (or otherwise associated with) an animate or inanimate object (or thing), such that territory-based actionable events may be initiated or performed based on the spatial positioning (or location) of the animate or inanimate thing. As such, territory-based actionable events may further be utilized for tracking objects (or things), such as animals, equipment, people, valuable items, etc.

Figure 2:
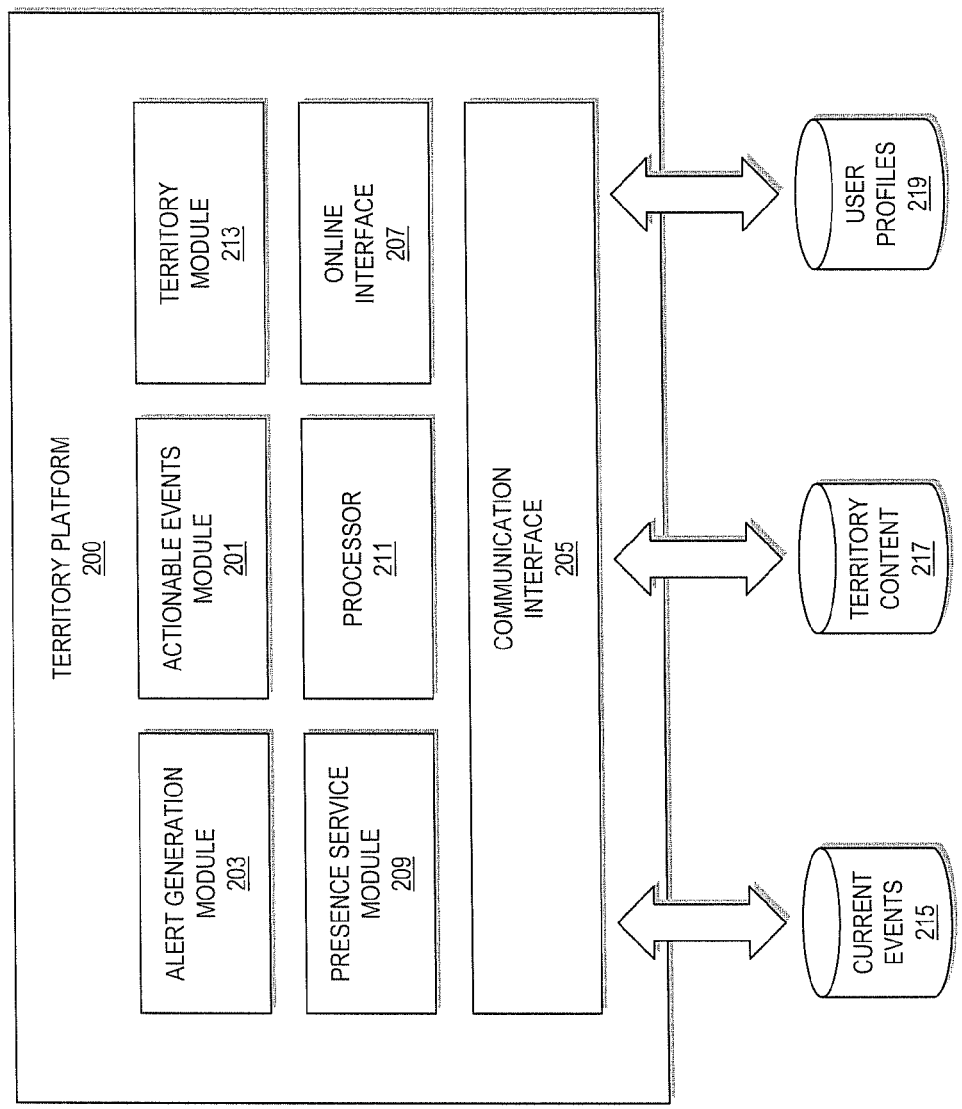
FIG. 2 is a diagram of a territory platform configured to provide territory-based actionable events, according to an exemplary embodiment.

FIG. 2 is a diagram of a territory platform configured to provide territory-based actionable events, according to an exemplary embodiment. Territory platform 200 may comprise computing hardware (such as described with respect to FIG. 9), as well as include one or more components configured to execute the processes described herein for providing the territory-based actionable event functionality. In one implementation, platform 200 includes actionable events module 201, alert generation module 203, communication interface 205, online interface 207, presence service module 209, processor (or controller) 211, and territory module 213. Platform 200 may also communicate with one or more repositories, such as current events repository 215, territory content repository 217, and user profiles repository 219. Users may access platform 200 (or the features and functionality provided thereby) via client devices 101, 119, and 121. While specific reference will be made to this particular implementation, it is also contemplated that platform 200 may embody many forms and include multiple and/or alternative components. For example, it is contemplated that the components of platform 200 may be combined, located in separate structures, or separate locations. In other instances, platform 200 may implement or interface with an electronic mail exchange server (not shown), such as described with respect to FIG. 7.

According to one embodiment, platform 200 embodies one or more application servers accessible to client devices 101, 119, and 121 over one or more of networks 105-111. Users (or subscribers) can access platform 200 to create, customize, and manage territory content, as well as generate and modify one or more user profiles that, in exemplary embodiments, include user profile information for initiating or performing one or more territory-based actionable events. It is contemplated that the actionable events may be dynamically initiated (or performed) based on real-time positional information corresponding to the location of mobile devices 101 and, in certain instances, correlation with user profile information. As such, platform 200 provides a user interface, e.g., web portal or otherwise networked application, to permit user access to the features and functionality of platform 200 via client devices 101, 119, and 121. According to certain embodiments, online interface module 207 may be configured for exchanging information between client devices 101, 119, and 121 and a web browser or other network-based application or system, such as a voice browser or interactive voice recognition system.

In exemplary embodiments, online interface module 207 executes a graphical user interface (GUI) configured to provide users with one or more menus of options for creating, customizing, and managing user profiles, as well as engaging with the other features of the territory-based actionable events service (or functionality) of system 100, such as obtaining notifications corresponding to the location of respective mobile devices 101, tracking respective mobile devices 101, remotely configuring respective mobile devices 101, etc. The GUI may also be utilized, in conjunction with territory module 213, to create, customize, and manage territory content, i.e., alert territories, friendly territories, and unfriendly territories.

Accordingly, the GUI may be utilized to create territories of various shapes or configurations. For instance, one or more territories may be defined as circular regions with corresponding central locations and radii of applicability. More specifically, an epicenter of a particular territory can be defined via a set of spatial coordinates (e.g., latitude, longitude, and/or altitude) or other like datum, such as an address, wherein a radius of applicability (e.g., all points within a distance "X" of the specified epicenter) may be established for creating the region of the territory. It is contemplated, however, that territories may be alternatively defined and, therefore, other suitable shapes or groupings of spatial coordinates may be provided as a territory definition.

Territory module 213, in one embodiment, can dynamically establish one or more territories based on current event information received from, for example, current events repository 215. This current event information may be received (or retrieved) in real-time, periodically, or in an on-demand fashion. As such, territory module 213 parses the current events information to determine whether or not a territory is to be established. For instance, territory module 213 may establish territories based on current events, such as natural disasters, emergency situations, trouble ticket occurrences (e.g., network outages), crimes, sport games, or other newsworthy happenings or events. Based on the area (or region) affected by a current event, territory module 213 defines the spatial boundary for one or more territory definitions and further determines what types of actionable events are required for corresponding current events. It is also noted that territory module 213 may schedule territory definitions. An exemplary process for dynamically creating territories based on current events is more fully explained in association with FIG. 4. In any event, territory module 213 can store predefined territories to territory content repository 217 or any other suitable storage location of system 100, such as a memory or repository of client devices 101, 119, or 121, or platform 200. It is also contemplated that the various storage locations for territory content can be synchronized.

According to exemplary embodiments, territory platform 200 is also configured to receive real-time positional information corresponding to the respective locations of one or more mobile devices (e.g., mobile device 101). Real-time positional information may be obtained from mobile devices 101 and, thereby, tracked via presence service module 209. Additionally (or alternatively), presence service module 209 may "poll" mobile devices 101 for real-time positional information, as well as capture presence information or availability of mobile devices 101, i.e., of subscribers of the territory-based actionable events service. An exemplary model for presence determination is detailed in Internet Engineering Task Force (IETF) Request for Comment (RFC) 2778, which is incorporated herein by reference in its entirety. According to certain embodiments, the presence or availability of mobile stations 101 may be utilized to initiate the territory-based actionable events service, e.g., commence mobile device tracking procedures for selectively initiating (or performing) one or more actionable events.

The presence and real-time positional information corresponding to the respective locations (or spatial positions) of mobile devices 101 may be utilized by alert generation module 203. Namely, alert generation module 203 can dynamically correlate the real-time spatial position (or location) of respective mobile devices 101 to one or more predefined territories stored to, for example, territory content repository 217. It is noted that the one or more predefined territories can be associated with respective mobile devices 101 and, thereby, specified within one or more user profiles stored to, for example, user profiles repository 219. Further, the territory content and/or user profile information may be additionally (or alternatively) stored to one or more other storage locations of system 100, such as one or more memories or repositories of platform 200 or client devices 101, 119, and 121. As previously mentioned, these storage locations may also be synchronized. In this way, alert generation module 203 may receive (or retrieve) one or more territory definitions and/or user profiles from one or more of the aforementioned storage locations, or may query territory module 213 and/or communication interface 205 to acquire this information (or content).

According to certain embodiments, alert generation module 203 may correlate the spatial position of mobile device 101 to a predefined territory by determining a distance from the spatial position to an epicenter of the territory. If the absolute value of the distance is less than the radius of applicability, mobile device 101 can be assumed to be within the territory, whereas if the absolute value of the distance is greater than the radius of applicability, mobile device 101 can be assumed to be within another territory (or region). As such, if mobile device 101 is not within any of its associated predefined territories, then mobile device 101 can be considered within a default territory that, in exemplary embodiments, can be established as an unfriendly territory. It is contemplated, however, that since territories may be alternatively defined (i.e., may be defined by configurations other than circular regions), any other suitable method for determining whether mobile devices 101 are within predefined territories may be utilized, such as by other geometric techniques or comparing spatial coordinates.

Based on such correlation of the location (or spatial position) of a mobile device (e.g., mobile device 101) with one or more predefined territories, alert generation module 203 can create or update a "status" for mobile devices 101, such as a "clear" status or an "alert" status. A clear status can be utilized when no territory-based actionable event is necessary, e.g., when respective mobile devices 101 are within their associated friendly territories. Alert statuses can be utilized when mobile devices are within alert or unfriendly territories. Based on the status of a mobile device, such as mobile device 101, alert generation module 203 can selectively generate an alert (or alarm). That is, depending on the particular territory that a mobile device 101 is located within and the status of the device 101, alert generation module 203 may or may not generate an alert. Further, alert generation module 203 may generate different types (or forms) of alerts depending on user profile information so that various generated alerts can be provided to actionable events module 201 for determining which one or more territory-based actionable events are to be initiated or performed. It is noted that the generation of alerts (or alarms) by alert generation module 203 may be further dependent upon scheduling information (e.g., date, time, etc.) that specifies whether a certain territory definition is active or inactive.

In exemplary embodiments, territory-based actionable event determinations can be made based on the alert type or form. Additionally (or alternatively), territory-based actionable event determinations can be made based on user profile information stored to, for example, user profiles repository 219. It is noted that the user profile information is, in exemplary embodiments, associated with respective mobile devices 101. More specifically, actionable events module 201 can utilize the territory that a mobile device (e.g., mobile device 101) is within and/or the alert type or form to "lookup" the one or more actionable events that are to be initiated or performed. It is also contemplated that actionable events module 201 may query user profiles repository 219 for this information. Further, it is contemplated that various territory-based actionable events may be scheduled, e.g., date and time information may be provided for specifying when territory-based actionable events are available for initiation or performance.

Accordingly, actionable events module 201 is configured to either initiate or perform determined territory-based actionable event(s), or signal an appropriate system 100 component or facility to initiate, perform, or carry out necessary procedures. For instance, one territory-based actionable event may relate to generating a notification to convey the location (or spatial position) of a mobile device 101 to an authorized individual or entity. The notification may be provided as a short or multimedia message or provided within an automated or personnel-based voice call. In certain embodiments, the spatial position or location of mobile devices 101 may be overlaid on a topical depiction (or map) of a cartographic or geographic area, such that pinpointing the location of mobile device 101 can be quickly ascertained. It is also contemplated that the notification may track the position of one or more mobile devices (e.g., mobile device 101) in real-time, such that authorized individuals or entities can "chase after" the mobile devices 101. Such a scenario can be useful when mobile device 101 is stolen and the authorities (e.g., police) are dispatched to retrieve device 101 from the pelpetrator(s). As another example, such a scenario may also be useful in emergency situations. Accordingly, the location of mobile devices 101 within alert territories affected by an emergency situation may be conveyed to rescue personnel at or near the alert territories to accelerate the recovery of individuals "carrying" these mobile devices 101.

Other territory-based actionable events may relate to initiating communication sessions with mobile devices 101 within a predefined territory, such as an unfriendly territory. For example, if mobile device 101 was stolen and, thereby, removed from all of its friendly territories, an associated actionable event may involve contacting mobile device 101, such as by placing an automated or personnel-based voice call to mobile device 101. In such a scenario, the perpetrator(s) may be informed that the authorities have been dispatched and asked to amicably relinquish possession of the device 101 without unnecessary force having to be exerted. As another example, a message or voice call may be placed to mobile device 101 to inform individuals around device 101 that the device 101 is misplaced, lost, or stolen and/or ask for help in the return of mobile device 101 to its rightful owner.

In further embodiments, territory-based actionable events may relate to remotely configuring one or more settings, parameters, or features of mobile devices 101. For instance, if mobile device 101 was misplaced, lost, or stolen and, thereby, removed from all of its friendly territories, an actionable event may relate to transmitting control commands, information, or signals to affected mobile devices 101 to, for instance, disable these devices 101. This can be useful in scenarios when sensitive or otherwise personal information is stored to devices 101, and the users (or owners) want to ensure that unauthorized individuals cannot access the information. According to other embodiments, territories may be defined for automatic configuration of mobile devices 101 within (or not within) predefined territories. As an example, a territory may be established for disabling camera functionalities on mobile device 101 within controlled environments, such as testing facilities for cutting edge technologies. Other remote configurations may relate to enabling, disabling, or modifying ringtones, ringbacks, endtones, communicative abilities, etc. Still other remote configurations can relate to enabling, disabling, or modifying audio settings, display settings, vibratory settings, or any other configurable features of mobile device 101.

It is also noted that territories and/or territory-based actionable events may be scheduled within one or more user profiles. As an example, an alert territory may be provisioned by a guardian (or parent) for a dependent mobile device user (e.g., one of their children) during school days, as well as during school hours. The alert territory may correspond to a location that the guardian does not want their child to venture to, such as any location besides their school premise during those corresponding days and times. Accordingly, if the child were to carry their mobile device 101 beyond a specified range or boundary of their school premise during those days or hours, then an alert may be generated by alert generation module 203 for initiating or performing a territory-based actionable event. For instance, the territory-based actionable event may be providing a notification (e.g., a text message) to the guardian informing them of such an occurrence. On the other hand, at the end of the school days or specified times, the alert territory (i.e., every location other than the school premise) may become a friendly territory, in which case an alert may not be necessary and, thereby, no actionable event need be initiated or performed. Furthermore, it is noted that territory module 213 may schedule dynamically created territory definitions, i.e., those territories created based on current events information.

In this manner, one or more actionable events may be initiated and/or performed based on the correlated location (or position) of mobile device 101. For example, a business owner may provide its employees with mobile devices 101 for conducting business transactions. Consequently, these mobile devices 101 may contain sensitive (e.g., trade secret) information. The business owner will, therefore, wish to prevent this information from being learned by their competitors. Accordingly, the business owner may provision various unfriendly territories as each of their competitors' places of business. When mobile devices 101 are transported to these premises, an alert may be generated and a plurality of actionable events may be initiated or performed. For instance, mobile devices 101 may be remotely disabled, and a communication session may be initiated to the business owner to inform the owner of the location of mobile devices 101 within the unfriendly territories. The communication session may be an automated or personnel-based voice call to convey the location of mobile devices 101 within the unfriendly territories, or may be a more sophisticated multimedia presentation providing historical or real-time tracking information overlaid on a topical depiction (or map) of a cartographic or geographic area. Such actionable events will facilitate the prevention of sensitive information of the business owner from being "learned" by their competitors, as well as aid the business owner in the retrieval of their devices 101.

In this manner, it is also contemplated that the aforementioned web portal (or networked application) provided by (or accessed through) online interface module 207, can be utilized to initiate or perform one or more territory-based actionable events even though no territory-based trigger has been executed. This is useful when mobile devices 101 are within friendly environments; however, subscribers of the territory-based actionable events service still desire at least one territory-based actionable event to be performed. For example, subscribers (such as parents or guardians) may simply want to know the "current" location of their child. That is, assuming a mobile device 101 is in the vicinity of the child, the subscriber may access platform 200 to ascertain the location of mobile device 101 and learn the whereabouts of their child. In other instances, territory-based actionable events may be initiated or performed based on the spatial positioning of mobile devices 101 within territories, such as friendly territories, or may be initiated or performed based on an authorization (or allowance) policy. Exemplary scenarios for these instances are more fully described with respect to FIGS. 6 and 7.

Accordingly, to provide selective access to the features and functionality of the territory-based actionable events service (or functionality) of system 100, territory platform 200 may also include an authentication module (not illustrated) for authenticating (or authorizing) users to the services. It is contemplated that the authentication module may operate in concert with communication interface 205 and/or online interface module 207. That is, the authentication module may verify user provided credential information acquired via communication interface 205 or online interface module 207 against corresponding credential information stored within a user profile of user profiles repository 219. By way of example, the credential information may include "log on" information corresponding to a user name, password, coded key, or other unique identification parameter, such a personal identification number (PIN). In other embodiments, the credential information may include any one, or combination of, a birth date, an account number (e.g., bank, credit card, billing code, etc.), a social security number (SSN), an address (e.g., work, home, IP, media access control (MAC), etc.), or telephone listing (e.g., work, home, cellular, etc.), as well as any other form of uniquely identifiable datum, e.g., biometric code, voice print, etc. Users may provide this information via client devices 101, 119, or 121, such as by spoken utterances, dual-tone multi-frequency signals (DTMF), packetized transmission, or other suitable method. Unobtrusive security may be provided by positively identifying and screening users based on one or more of the aforementioned credentials that may be seamlessly provided when client devices 101, 119, or 121 communicate with platform 200, such as a unique IP or MAC address. Other unobtrusive measures can be made available via user specific voice prints, etc.

Additionally, platform 200 may include one or more processors (or controllers) 211 for effectuating the territory-based actionable events service, as well as one or more memories (not shown) for permanent or temporary storage of one or more of the previously described control commands, parameters, territories, user profile information, variables, etc.

Figure 3:
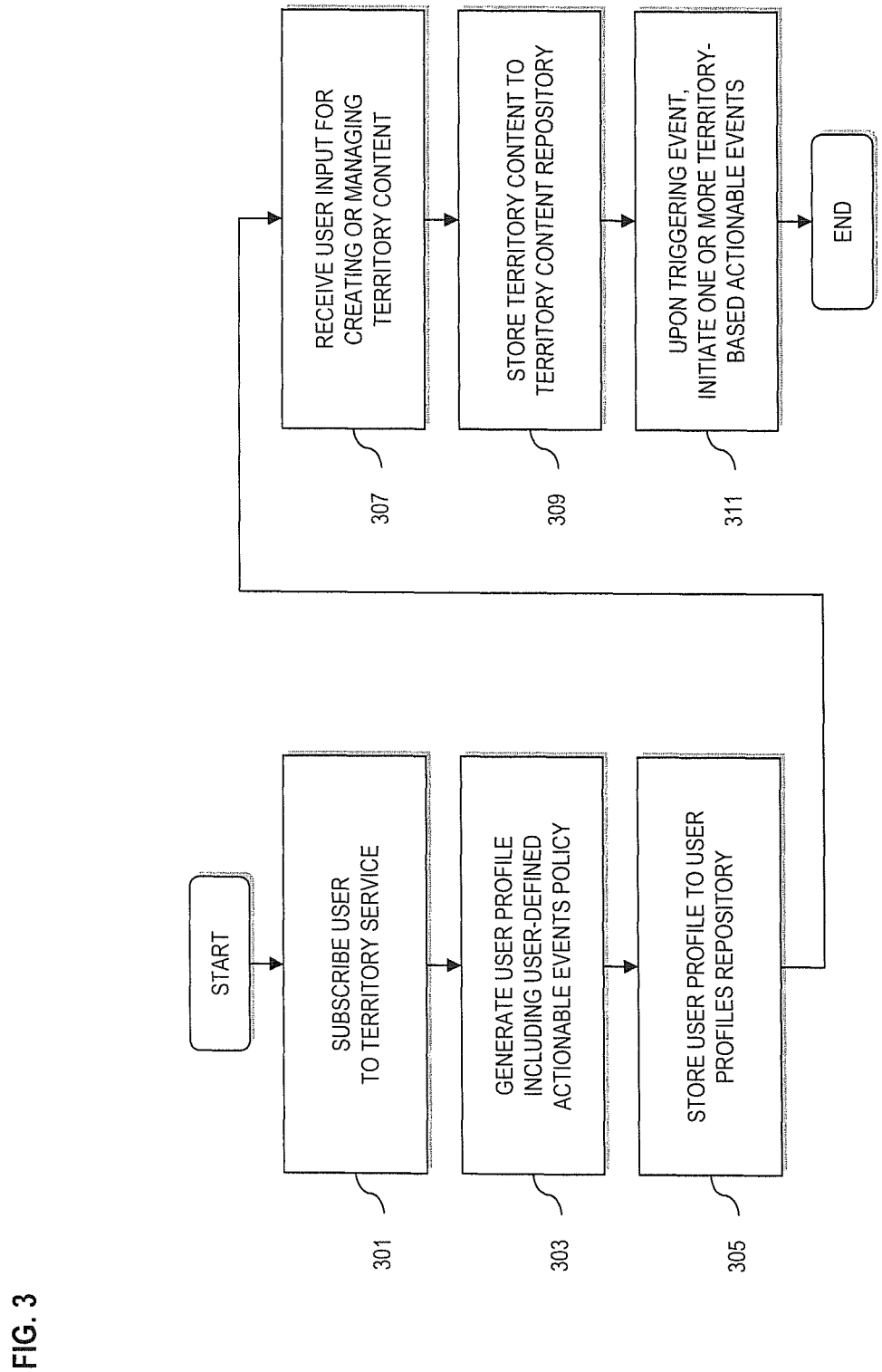
FIG. 3 is a flowchart of a process for providing territory-based actionable events, according to an exemplary embodiment.

FIG. 3 is a flowchart of a process for providing territory-based actionable events, according to an exemplary embodiment. For illustrative purposes, the process is described with respect to a network-coordinated service and, thereby, with reference to FIG. 1. It is noted that the steps of the process may be performed in any suitable order, as well as combined or separated in any suitable manner. At step 301, territory platform 113 subscribes a user to the territory service of system 100. According to one embodiment, the user may subscribe utilizing a client device capable of processing and transmitting information over one or more of networks 105-111, such as computing device 119, mobile device 101, or voice station 121. Namely, the user may interact with an input interface of, for example, mobile device 101 to activate software resident on the device, such as a GUI or other networked application that interfaces with (or is implemented by) platform 113. As such, the user can register as a new subscriber of the territory service, as well as obtain sufficient authentication information for establishing future sessions with platform 113. In certain embodiments, registration procedures may prompt the user to identify all mobile devices, such as mobile device 101, that the user may employ to interact with the territory service of system 100. In this manner, registered devices may be logically associated with the user and, in certain instances, share similar actionable event policies and/or territory definitions.

Once registered, platform 113 enables the user, per step 303, to generate a user profile including at least one user-defined actionable events policy for extending the territory service to the user. The user profile may include the earlier described user profile information, e.g., username, password, account information, billing information, configuration information, and the like, as well as include one or more user-defined actionable event policies and/or one or more associations to one or more territory definitions. Thus, user profile information may be utilized by one or more actionable events modules (e.g., actionable events modules 103a and 103b) for selectively initiating one or more actionable events based on the location of a mobile device, such as mobile device 101, as will become more apparent below.

After generating a user profile, platform 113 stores the user profile to a list of subscribers to the territory service of system 100, as well as a list of subscriber device identifiers, authentication information, and user-defined profile(s) to user profiles repository 117, per step 305. It is contemplated that platform 113 may store or synchronize this information to a memory of, for instance, platform 113, one or more memories of devices 101, 119, and 121, or any other suitable storage location of system 100. Further, it is contemplated that users may directly interact with one or more of these storage locations or facilities, such as user profiles repository 117.

At step 307, platform 113 may receive user input for creating or managing territory content. For instance, the user may define one or more territories by providing a spatial position (e.g., a latitude, longitude, and/or altitude) and a radius of applicability. In other instances, users may create territories via interaction with a map, such as drawing an outline of a territory on the map. It is noted that territories may also be pre-established by the provider of the territory service, or dynamically defined by platform 113 based on, for example, current events information. The creation of dynamically defined territories is explained in more detail in conjunction with FIG. 4.

Per step 309, the user created or managed territory content is stored to, for example, territory content repository 115, which may be service provider maintained and, thereby, also include service provider defined territories and/or dynamically defined territories. Accordingly, this territory content may also be stored (or linked) to one or more user profiles of user profiles repository 117. Further, the territory content may be additionally (or alternatively) stored at or synchronized with a memory of one or more of devices 101, 119, or 121, or another suitable storage location. Thus, platform 113 via actionable events module 103b, can initiate, per step 311, one or more territory-based actionable events upon a triggering event, such as one or more events established within at least one user-defined actionable events policy of the user. It is also contemplated that platform 113 can signal respective mobile devices (e.g., mobile device 101) to perform certain tasks, such as initiating one or more territory-based actionable events, via respective actionable events modules (e.g., actionable events module 103a). Further, it is contemplated that the aforementioned process may be wholly or partly performed by a client device, such as mobile station 101, as opposed to platform 113.

Figure 4:
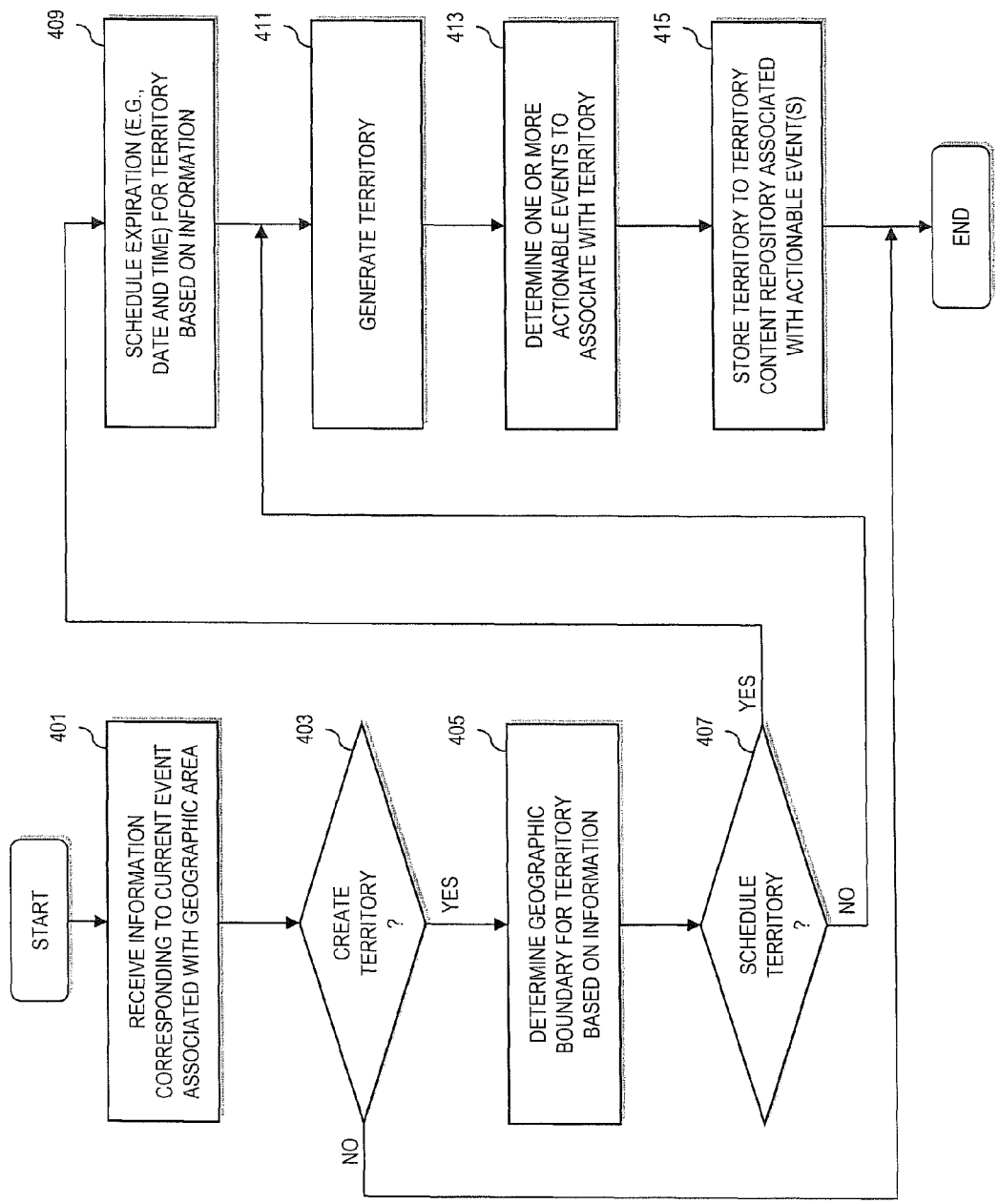
FIG. 4 is a flowchart of a process for dynamically establishing one or more territories based on current events, according to an exemplary embodiment.

FIG. 4 is a flowchart of a process for dynamically establishing one or more territories based on current events, according to an exemplary embodiment. For illustrative purposes, the process is described with respect to the system of FIG. 2. It is noted that the steps of the process may be performed in any suitable order, as well as combined or separated in any suitable manner. At step 401, territory platform 200 receives, via communication interface 205, information corresponding to a current event associated with a geographic area (or region) from current events repository 215. In exemplary embodiments, the current events information is received in real-time, e.g., temporally proximate to the occurrence of the current event. The information is ported to territory module 213 for determination as to whether the current event requires at least one territory to be dynamically established, per step 403. If no territory is to be created, then the process ends. If the current event warrants at least one territory to be created, then territory module 213 determines a geographic boundary for the at least one territory based on the received information, during step 405. For instance, if the current event relates to a natural disaster warning for a county, territory module 213 can establish a territory region around the county. As another example, if the current event relates to a network failure, such as a break in a fiber optic trunk, territory module 213 can establish a territory region at the site of the break.

At step 407, territory module 213 determines whether or not to schedule expiration for the territory. If the territory is to be scheduled, territory module 213 (in step 409) determines scheduling information for the territory, such as an expiration date and time, based on the received information. For instance, if the natural disaster warning was issued for the next two hours, territory module 213 may schedule the expiration of the territory at termination of a two hour time period. If the territory is not to be scheduled, the process proceeds to step 411. For example, if the network failure will continue until a future recovery time, the established territory should permanently exist until the failure is fixed. At step 411, territory module 213 generates the territory. At step 413, territory module 213 determines which one or more territory-based actionable events are to be associated with the generated territory. For example, a territory-based actionable event for the natural disaster warning may correspond to notifying respective mobile devices (e.g., mobile device 101) positioned within the related territory. In the case of the network failure, an actionable event may relate to establishing a communication session with a mobile device (e.g., mobile device 101) of a workforce member to dispatch the workforce member to the site of the network failure. In certain instances, workforce members may be identified based on their proximity to the territory.

At step 415, territory module 213 stores the territory associated with the actionable event(s) to territory content repository 217 via communication interface 205. It is contemplated, however, that this information may be stored to a local memory (not shown) of platform 200, one or more local memories of a mobile device (e.g., mobile device 101), or other suitable storage location of system 100.

Figure 5:
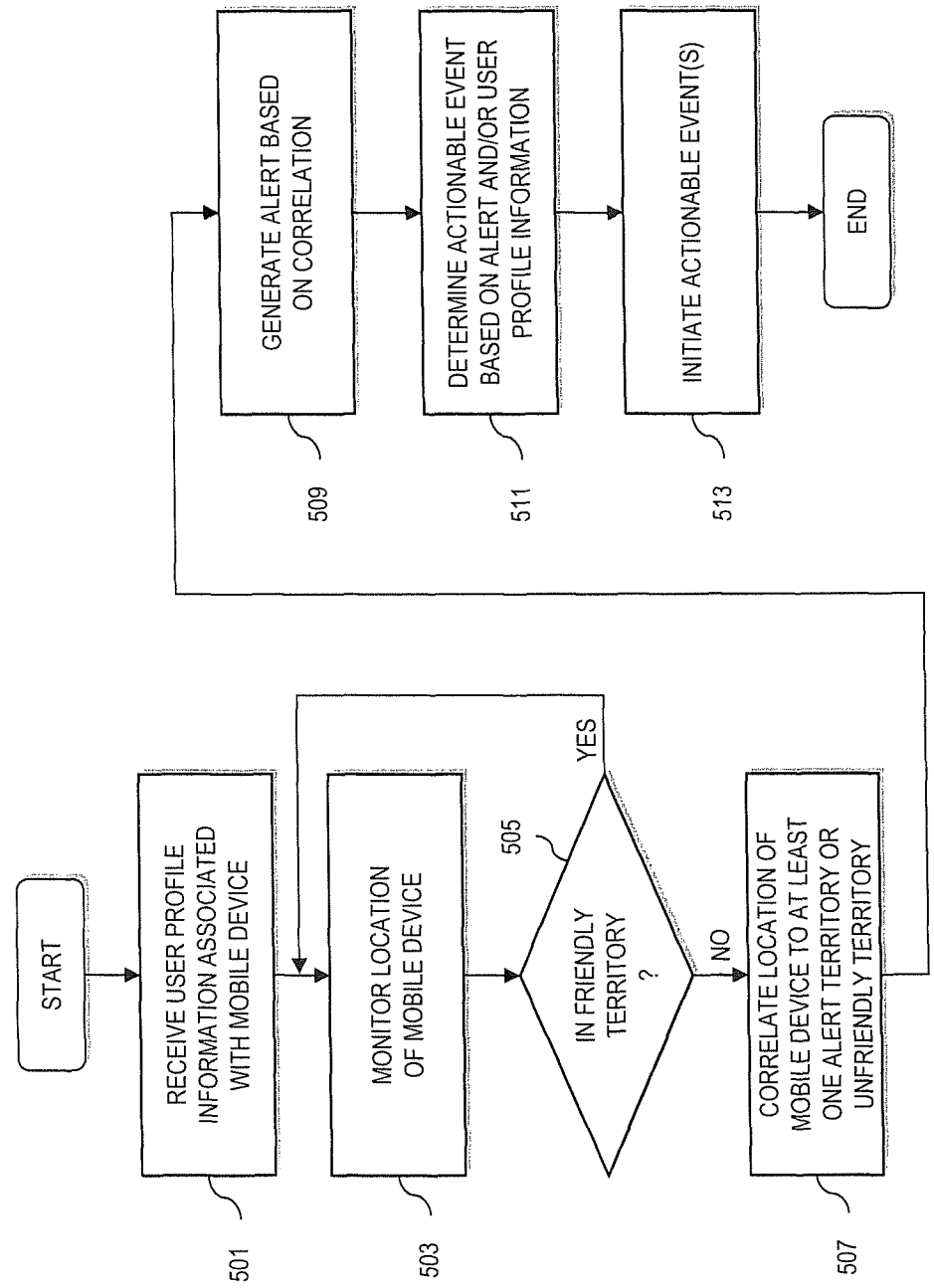
FIG. 5 is a flowchart of a process for initiating one or more actionable events based on location of mobile device, according to an exemplary embodiment.

FIG. 5 is a flowchart of a process for initiating one or more actionable events based on location of mobile device, according to an exemplary embodiment. For illustrative purposes, the process is described with reference to FIGS. 1 and 2. It is noted that the steps of the process may be performed in any suitable order, as well as combined or separated in any suitable manner. Furthermore, the process is explained as being implemented by territory platform 200; however, the process is equally implementable by mobile device 101. At step 501, territory platform 200 receives (or retrieves) user profile information associated with mobile device 101 from user profiles repository 219. In exemplary embodiments, the user profile information includes one or more user-defined actionable events policies for initiating one or more territory-based actionable events based on the location (or spatial positioning) of mobile device 101 in relation to one or more predefined territories. At step 503, presence service module 209 monitors the location of mobile device 101. Presence service module 209 can monitor the location of mobile device 101 by periodically or continuously polling mobile device 101 for its spatial position. In one embodiment, mobile device 101 may periodically or continuously report its spatial position to presence service module 209. In either instance, however, presence service module 209 can receive, over one or more of networks 105-111, real-time positional information corresponding to a location of mobile device 101.

Per step 505, alert generation module 203 determines whether mobile device 101 is in a friendly territory based on the "current" location (or spatial positioning) of mobile device 101 in relation to one or more friendly territories stored to, for example, territory content repository 217. If mobile device 101 is in a friendly territory, then presence service module 209 continues to monitor the location of mobile device 101. If mobile device 101 is not in a friendly territory, then alert generation module 203 correlates (in step 507) the location of mobile device 101 to at least one alert or unfriendly territory stored to, for example, territory content repository 217. It is noted that information corresponding to the alert, friendly, and unfriendly territories can be received with the user profile information during step 501. Based on the correlation, i.e., which unfriendly territory mobile device 101 happens to be positioned in, alert generation module 203 generates a corresponding alert in step 509. The alert is ported to actionable events module 201 that determines (per step 511) which one or more actionable events to initiate based on the user profile information. At step 513, actionable events module 201 initiates determined actionable event(s). For instance, actionable events module 201 may notify an authorized user or entity with the location of mobile device 101, may attempt to establish a communication session with mobile device 101, or may transmit configuration information to mobile device 101 to remotely configure (e.g., disable) mobile device 101. It is contemplated, however, that other suitable actionable events may be initiated (or performed) by actionable events module 201.

According to particular embodiments, one or more of actionable events modules 103*a* and 103*b* may be configured to convey the location of mobile device 101 to other users initiating, receiving, or engaged in a communication session with mobile device 101.

Figure 6:
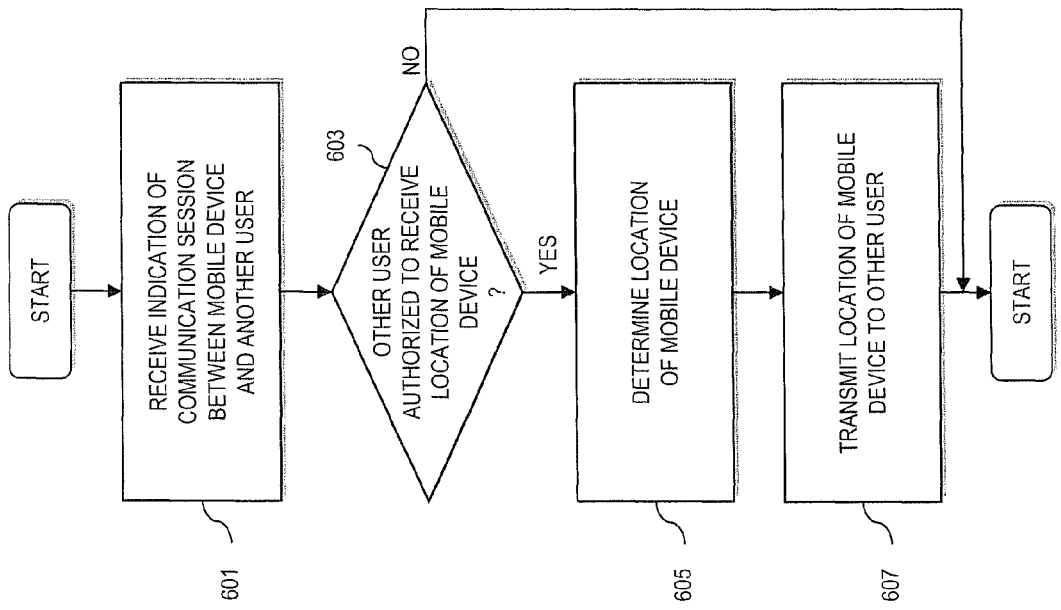
FIG. 6 is a flowchart of a process for conveying location of a mobile device engaged in a communication session, according to an exemplary embodiment.

FIG. 6 is a flowchart of a process for conveying location of a mobile device engaged in a communication session, according to an exemplary embodiment. For illustrative purposes, the process is described with respect to FIGS. 1 and 2. At step 601, actionable events module 201 receives an indication of a communication session between mobile device 101 and another user at a suitable client device, such as another mobile device 101, computing device 119, or voice station 121. This indication may be provided by one or more of devices 101, 119, or 121, or may be provided by a communication session processing node (e.g., router, switch, etc.) of one or more of networks 105-111.

In step 603, actionable events module 201 determines whether the other user is authorized to receive the location of mobile device 101. Such a determination can be performed based on user profile information stored to user profiles repository 219 or another storage location of system 100, such as a local memory of mobile device 101, etc. If the other user is authorized to receive the location of mobile device 101, then actionable events module 201 determines the location of mobile device 101, in step 605. That is, actionable events module 201 queries either mobile device 101 or presence service module 209 for the "current" location (or spatial position) of mobile device 101. Once the location is determined, actionable events module 201 transmits the location of mobile device 101 to the other user over one or more of networks 105-111 via communication interface 205, per step 607.

According to certain embodiments, one or more of actionable events modules 103*a* and 103*b* are configured to deliver (i.e., transmit) electronic mail to one or more mobile devices, e.g., mobile device 101, associated with one or more recipients based on the location of the mobile device(s) 101 of the recipient(s). As such, actionable events modules 103*a* or 103*b* may interface with an electronic mail exchange server (not shown) of system 100. In other instances, territory platform 200 may implement the electronic mail exchange server, or may be implemented by the mail exchange server.

Figure 7:
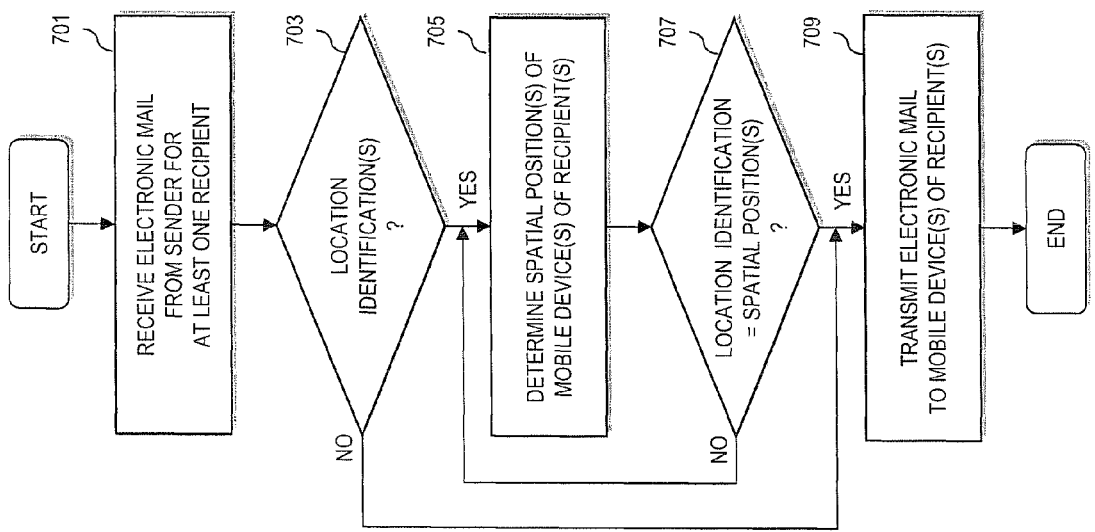
FIG. 7 is a flowchart of a process for electronic mail delivery based on the location of a mobile device, according to an exemplary embodiment.

FIG. 7 is a flowchart of a process for electronic mail delivery based on the location of a mobile device, according to an exemplary embodiment. For illustrative purposes, the process is described with respect to FIGS. 1 and 2. In this example, it is assumed that territory platform 200 includes an electronic mail exchange module (not shown) for delivering (i.e., transmitting) electronic mail received from a sender and, thereby, intended for at least one recipient, such as a recipient at mobile device 101. It is contemplated, however, that one or more of actionable events modules 103a or 103b may interface with a standalone electronic mail exchange server (not shown) accessible over one or more of networks 105-111. As such, the standalone mail exchange server may be hosted by the service provider of the territory service of system 100 or a third-party electronic mail provider. Alternatively, the standalone mail exchange server may implement territory platform 200. Nevertheless, the process is equally applicable to each of these system 100 topological scenarios.

At step 701, the electronic mail exchange module receives electronic mail from a sender for at least one recipient. As is known, conventional electronic mail includes header information (e.g., sender, recipient(s), subject, date, etc.) and a body including content embodying the electronic mail message itself. Typically, the header information is included within one or more fields that include corresponding names and values. An exemplary model for the header fields, names, and values is detailed in Internet Engineering Task Force (IETF) Request for Comments (RFC) 2076, 2822, and 4021, which are incorporated herein by reference in their entireties. In exemplary embodiments, the conventional electronic mail header information can be appended with additional location identification information (e.g., one or more territory definitions) that specifies one or more spatial positions (or locations) at which the one or more recipients of the electronic mail are authorized to receive the electronic mail. This location identification information can be included in one or more fields with corresponding values for specifying an address, a set of coordinates (e.g., latitude, longitude, altitude, and/or radius of applicability), or any other suitable spatial positioning datum, such as a wireless network access point site, etc. As such, the location identification(s) may be specific to one or more recipients or may be generally applied to all recipients.

Accordingly, in step 703, the electronic mail exchange module determines if one or more location identifications have been specified in the header of the electronic mail. If there are one or more location identifications, the electronic mail exchange module ports the location identification information to alert generation module 203 to correlate the location identification information with the "current" spatial position (or location) of the mobile devices (e.g., mobile device 101) of the recipient(s). That is, alert generation module 203 queries presence service module 209 to determine the spatial position(s) of mobile device(s) 101 of the recipient(s), per step 705. In step 707, alert generation module 203 correlates the spatial position(s) to the location identification information to determine whether the spatial position of one or more of the mobile devices 101 of the recipient(s) relate to the location identification information, i.e., whether the recipient(s) are within an authorized territory definition to receive electronic mail from the sender.

According to one embodiment, the sender may specify that the spatial positioning of all or groups of the mobile device(s) 101 of the recipient(s) must concurrently correlate to the location identification information. In other instances, the sender may specify that mobile devices 101 of the recipient(s) must, at some point (e.g., before electronic mail delivery) individually correlate to the location identification information. If the spatial position(s) of the mobile devices 101 of the recipient(s) do correlate, then alert generation module 203 informs (i.e., provides a corresponding alert to) the electronic mail exchange module (directly or via actionable events module 201), such that the electronic mail exchange module can transmit (per step 709) the electronic mail to the mobile device(s) 101 of the respective recipient(s). If the spatial position(s) do not correlate, then alert generation module 203 and/or presence service module 209 will continue to monitor the spatial positioning (or location) of the mobile devices 101 of the recipient(s). If, however, no location identification information is specified in the electronic mail header information, then the electronic mail can be delivered in a conventional manner, i.e., in a known store-and-forward fashion.

Figure 8:
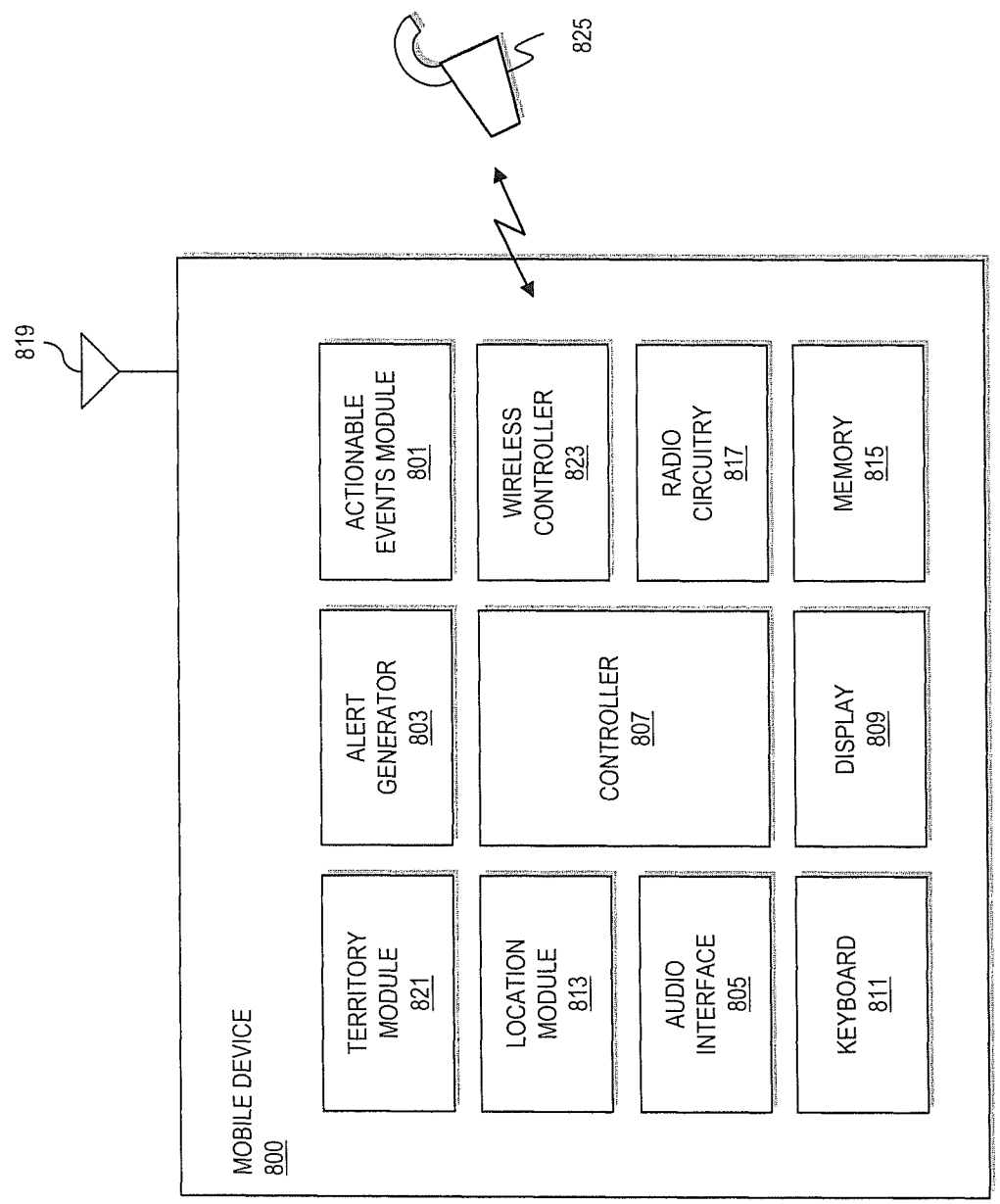
FIG. 8 is a diagram of a mobile device configured for providing territory-based actionable events, according to an exemplary embodiment.

FIG. 8 is a diagram of a mobile device configured for providing territory-based actionable events, according to an exemplary embodiment. Mobile device 800 may comprise computing hardware (such as described with respect to FIG. 9), as well as include one or more components configured to execute the processes described herein for providing territory-based actionable events. In this example, mobile device 800 includes actionable events module 801, alert generator 803, audio interface 805, controller (or processor) 807, display 809, keyboard 811, location module 813, memory 815, radio circuitry 817 coupled to antenna 819, territory module 821, and wireless controller 823. While specific reference will be made thereto, it is also contemplated that mobile device 800 may embody many forms and include multiple and/or alternative components.

According to various embodiments, mobile device 800 is configured to transmit real-time positional information corresponding to its location to territory platform 200. In return, territory platform 200 correlates the location to one or more predefined territories and selectively generates an alert based on correlation. Depending on the alert generated, one or more actionable events may be initiated or performed. The determination of which one or more actionable events are to be initiated or performed can be based further on user profile information associated with mobile device 800. It is contemplated, however, that mobile device 800 may, in certain other embodiments, assume one or more of the aforementioned responsibilities of territory platform 200 or function in concert with territory platform 200. As such, mobile device 800 includes one or more client programs (or instructions) that operate thereon to access and/or execute these functions; however, it is contemplated that these client programs may be executed by platform 200 (or another facility of system 100) and, thereby, accessible to users via mobile device 200.

The client programs may relate to one or more GUIs configured to control the creation, customization, and management of territory content, as well as the generation and modification of one or more user profiles that, in exemplary embodiments, include user profile information for initiating or performing one or more territory-based actionable events. Network browser applications may be provided for accessing similar applications made available by, for example, territory platform 200. Users may interface with these client programs via audio interface 805, display 809, keyboard 811, and/or any other suitable input mechanism, e.g., buttons, joysticks, soft controls, touch panels, widget applications, etc. Audio interface 805 may include one or more components and corresponding functionality for effectuating a voice interface, e.g., speech synthesis technology and voice recognition capabilities.

Accordingly, the one or more client programs may be stored to memory 815, which may include volatile and/or non-volatile memory, such as erasable programmable read-only memory (EPROM), electrically erasable programmable read-only memory (EEPROM), flash memory, random access memory (RAM), read only memory (ROM), etc. Memory 815 may be implemented as one or more discrete devices, stacked devices, or integrated with controller 807. In addition, communication signals, such as voice calls, short messages, multimedia messages, and control signals, received by mobile device 800 may also be stored to memory 815.

Real-time positional information may be obtained or determined via location module 813 using, for example, GPS technology. In this way, location module 813 can behave as a GPS receiver. Thus, mobile device 800 employs location module 813 to communicate with a constellation 125 of satellites. These satellites 125 transmit very low power interference and jamming resistant signals that can be received by GPS receiver 813. At any point on Earth, GPS receiver 813 can receive signals from multiple satellites (e.g., 6 to 11). Specifically, GPS receiver 813 may determine three-dimensional geolocation (or spatial positional information) from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by GPS satellites 125. Therefore, if mobile device 800 can identify the signals from at least four satellites 125, receiver 813 may decode the ephemeris and clock data, determine the pseudo range for each satellite 125 and, thereby, compute the spatial position of a GPS receiving antenna (not shown). With GPS technology, mobile device 800 can determine its spatial position with great accuracy and convenience.

Additionally, mobile device 800 may employ A-GPS to mitigate the loss of GPS signals from obstructions between the GPS receiver 813 and satellites 125. When operating in A-GPS mode, mobile device 800 can provide for better in building or obstructed view spatial positional information. Assistance data can be transmitted to mobile device 800 from, for example, wireless network 111. In an exemplary embodiment, A-GPS information may include ephemeris data, differential GPS correction data, timing data, and other aiding data. Using the aiding (or assistance) data, location module 813 performs spatial positioning calculations via, for example, controller (or processor) 807. In an exemplary embodiment, mobile device 800 can generate real-time speed and route adherence alerts using this calculated information. Additionally, transmission of the spatial positional information need not be frequent. Further, transmission of the geolocation data can be made more compact because it is true location rather than pseudo range data. Also, mobile device 800 can more intelligently request assistance data because the device can itself determine when ephemeris data is no longer valid. It is also contemplated that other suitable navigation and location determination technologies may be utilized, such as advanced forward link trilateration (A-FLT), enhanced cellular identification (CELL-ID), wireless local area network (WLAN) positioning, etc. In any case, determined spatial positional information may be transmitted to territory platform 200 via radio circuitry 817 and/or wireless controller 823. It is generally noted that wireless controller 823 may also be utilized to communicate with a wireless headset 825. Headset 825 can employ any number of standard radio technologies to communicate with wireless controller 823; for example, headset 825 can be BLUETOOTH™ enabled. It is contemplated that other equivalent short range radio technology and protocols can be utilized.

Received information, such as spatial positioning information, warnings, incoming communication sessions, one or more pages of GUI content, etc., may be presented to users via display 809. Mobile device 800 is also configured to store and execute instructions for supporting the territory-based actionable events services of system 100, as well as other communication functions made available via radio circuitry 817. In this manner, controller 807 controls the operation of mobile device 800 according to programs and/or data stored to memory 815. Control functions may be implemented in a single controller (or processor) or via multiple controllers (or processors). Suitable controllers may include, for example, both general purpose and special purpose controllers, as well as digital signal processors, local oscillators, microprocessors, and the like. Controller 807 may also be implemented as a field programmable gate array controller, reduced instruction set computer processor, etc. Controller 807 may interface with audio interface 805 that provides analog output signals to one or more speakers (not shown) and receives analog audio inputs from one or more microphones (not illustrated).

According to some embodiments, mobile device 800 includes actionable events module 801, alert generator 803, and territory module 821 for assuming one or more of the aforementioned functions described with respect to territory platform 200. In this way, modules 801, 803, and 821 will operate similarly to modules 201, 203, and 213 of territory platform 200. It is noted, however, that real-time positioning information can be acquired via location module 813, instead of (or in addition to) presence service module 209.

The processes described herein for providing territory-based actionable events may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
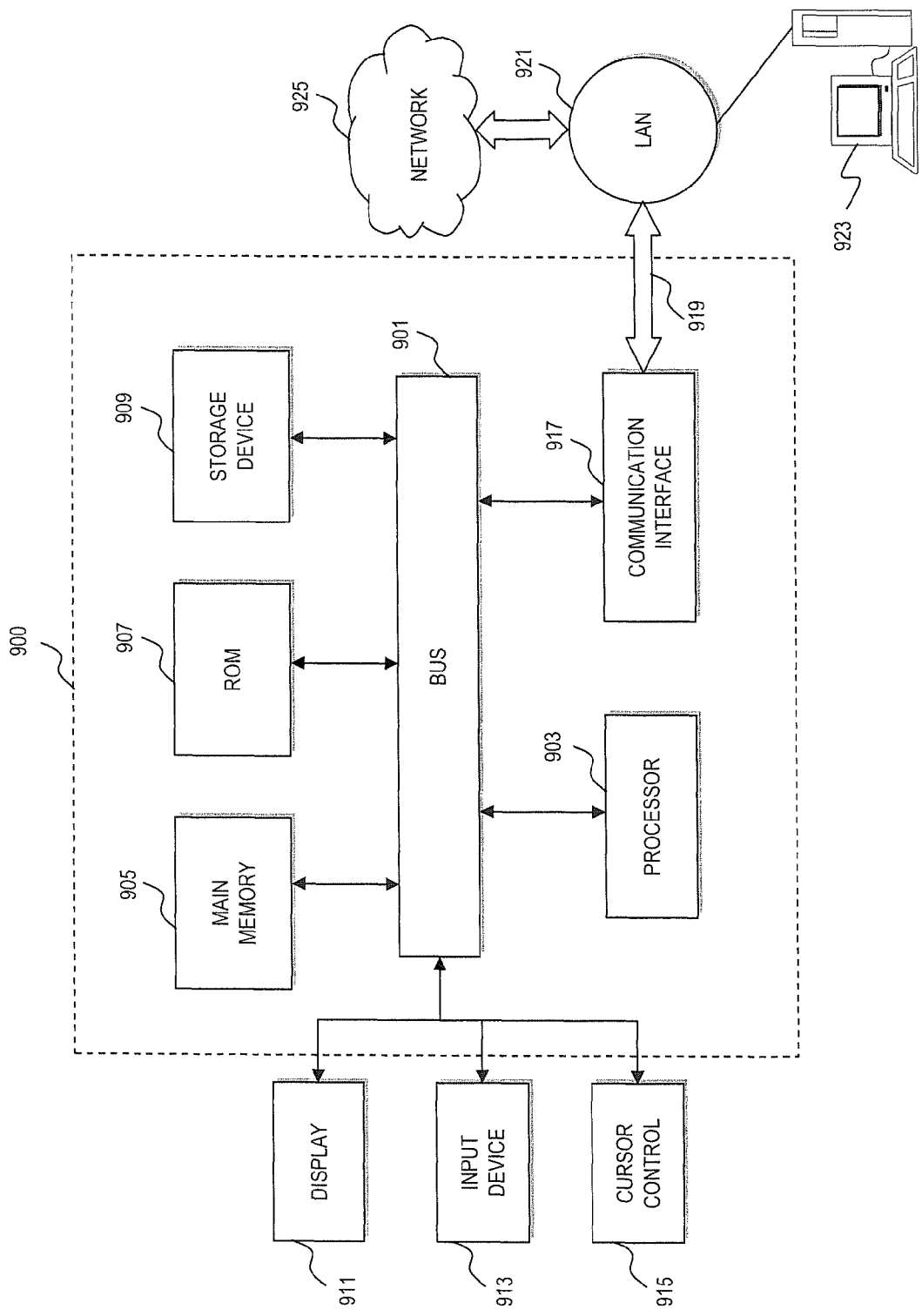
FIG. 9 is a diagram of a computer system that can be used to implement various exemplary embodiments.

FIG. 9 illustrates computing hardware (e.g., computer system) 900 upon which an embodiment according to the invention can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, over a communication network, real-time positional information corresponding to a location of a device;
   correlating the location to one or more predefined territories, the territories are defined based on upon scheduling information, or dynamically defined based on current event information; and
   selectively generating an alert based on the correlation,
   wherein an event is performed in response to generation of the alert, and
   wherein the predefined territories include a friendly territory, and an unfriendly territory, the alert being generated if the location is within the unfriendly territory.

2. A method according to claim 1, further comprising:
determining the event based on user profile information associated with the device.

3. A method according to claim 1, wherein date and time information specify when the event is available for performance.

4. A method according to claim 1, wherein the event includes,
notifying an authorized individual or entity as to the location of the device,
remotely disabling the device, or
attempting to establish a communication session with the device.

5. A method according to claim 1, further comprising:
creating each of the predefined territories based on a central location and a radius of applicability.

6. A method according to claim 1, further comprising:
forwarding the location of the device to an authorized individual via a networked application.

7. A method according to claim 1, wherein the device is a mobile device or a stationary device.

8. A method according to claim 1, wherein the device is associated with an animate or inanimate object.

9. An apparatus comprising:
a communication interface configured to receive, over a communication network, real-time positional information corresponding to a location of a device; and
an alert generation module configured to correlate the location to one or more predefined territories defined based on upon scheduling information, or dynamically defined based on current event information, and to selectively generate an alert based on the correlation,
wherein an event is performed in response to generation of the alert, and
wherein the predefined territories include a friendly territory, and an unfriendly territory, the alert being generated if the location is within the unfriendly territory.

10. An apparatus according to claim 9, further comprising:
an event module configured to determine the event based on user profile information associated with the device.

11. An apparatus according to claim 9, wherein date and time information specify when the event is available for performance.

12. An apparatus according to claim 9, wherein the event includes,
notifying an authorized individual or entity as to the location of the device,
remotely disabling the device, or attempting to establish a communication session with the device, or
attempting to establish a communication session with the device.

13. An apparatus according to claim 9, further comprising:
a territory module configured to create each of the predefined territories based on a central location and a radius of applicability.

14. An apparatus according to claim 9, further comprising:
an online interface configured to forward the location of the device to an authorized individual via a networked application.

15. An apparatus according to claim 9, wherein the device is a mobile device or a stationary device.

16. An apparatus according to claim 9, wherein the device is associated with an animate or inanimate object.

17. A system comprising:
a platform configured to
subscribe a plurality of devices to an alert service, and to define, for each of the devices, an alert territory for triggering an alert upon entry of the device into the alert territory,
receive real-time positional information corresponding to a location of at least one of the devices, and
perform, for each of the devices, an actionable event when the location information corresponding to the device correlates with the assigned alert territory for the device,
wherein the alert territories are defined according to a schedule and the actionable event is executed according to a pre-defined policy, policy, and
wherein the platform is further configured to define a friendly territory for one or more of the devices, and the one or more devices being configured to receive another alert upon exiting the friendly territory.

18. A system according to claim 17, wherein users of the devices are alerted via respective ones of the devices upon entry of the alert territories.

19. A system according to claim 17, wherein the platform is further configured to notify one of the devices of a location of another one of the devices during communication between the one mobile device and the other mobile device.

20. A system according to claim 17, wherein the platform is further configured to dynamically create the alert territories of the respective devices based on proximity to a particular location.

21. A system according to claim 17, wherein the platform is further configured to transmit electronic mail to a recipient device based on a location of the recipient device.

22. A system according to claim 17, wherein date and time information specify when the actionable event is available for performance.

* * * * *